United States Patent
Frydendal et al.

(10) Patent No.: US 12,173,695 B2
(45) Date of Patent: Dec. 24, 2024

(54) AXIAL SEAL FOR A GENERATOR ROTOR OF A WIND TURBINE

(71) Applicant: Siemens Gamesa Renewable Energy A/S, Brande (DK)

(72) Inventors: Niels Karl Frydendal, Herning (DK); Søren Poulsen, Holstebro (DK); Vujadin Petronic, Brande (DK); Kim Thomsen, Skørping (DK); Morten Thorhauge, Ry (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/510,827

(22) Filed: Nov. 16, 2023

(65) Prior Publication Data

US 2024/0175427 A1   May 30, 2024

(30) Foreign Application Priority Data

Nov. 30, 2022  (EP) .................................... 22210466

(51) Int. Cl.
*F03D 80/70* (2016.01)
*F03D 80/80* (2016.01)

(52) U.S. Cl.
CPC ........... *F03D 80/709* (2023.08); *F03D 80/88* (2016.05); *F05B 2220/706* (2013.01)

(58) Field of Classification Search
CPC ........ F03D 9/25; F03D 15/205; F03D 15/207; F03D 80/70; F03D 80/705; F03D 80/707; F03D 80/709
See application file for complete search history.

(56) References Cited

U.S. PATENT DOCUMENTS

| 4,895,458 A | 1/1990 | Gerster |
| 2021/0140483 A1 | 5/2021 | Kroeger et al. |
| 2022/0282791 A1 | 9/2022 | Prem et al. |

FOREIGN PATENT DOCUMENTS

| CN | 112049760 A | | 12/2020 |
| CN | 215567920 U | * | 1/2022 |
| DE | 10 2010 019 442 A1 | | 11/2011 |
| GB | 1180492 A | | 2/1970 |

* cited by examiner

*Primary Examiner* — Courtney D Heinle
*Assistant Examiner* — John S Hunter, Jr.
(74) *Attorney, Agent, or Firm* — Schmeiser, Olsen & Watts, LLP

(57) ABSTRACT

A sealing arrangement of a wind turbine is provided including an axial seal, a stationary member and a generator rotor for sealing a gap between the stationary member and the generator rotor. Accordingly, the stationary member is arranged between a lubricant chamber and an air chamber and the generator rotor is configured to rotate about a rotational axis, wherein the seal is arranged at an end of the stationary member. The seal includes a first lip configured to contact the generator rotor and the first lip is configured to allow a leakage of lubricant at the contact between the first lip and the generator rotor. The seal further includes a second lip arranged radially outwards with respect of the first lip and the rotational axis.

15 Claims, 5 Drawing Sheets

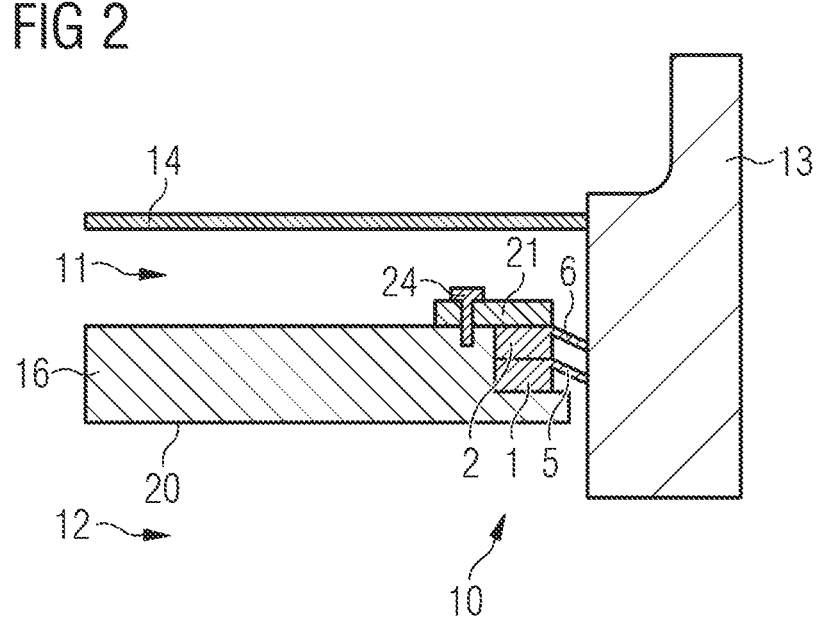
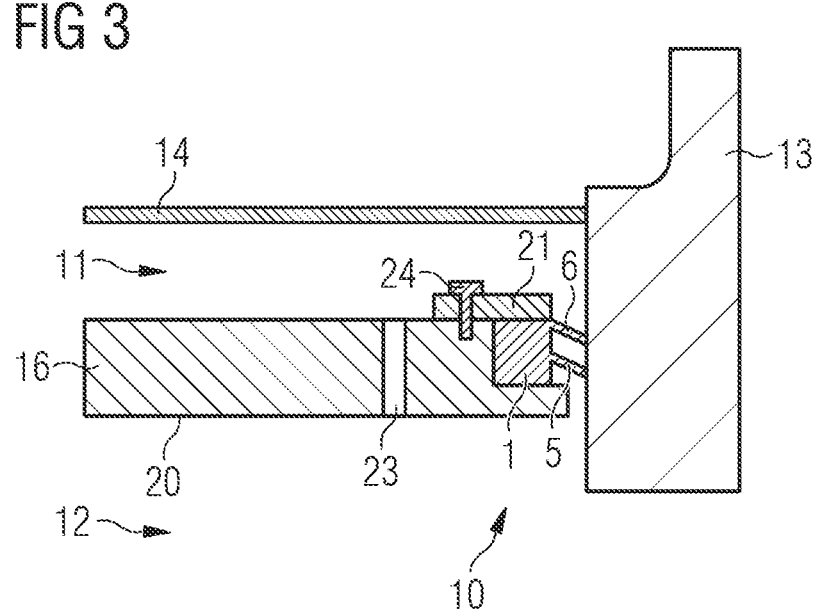

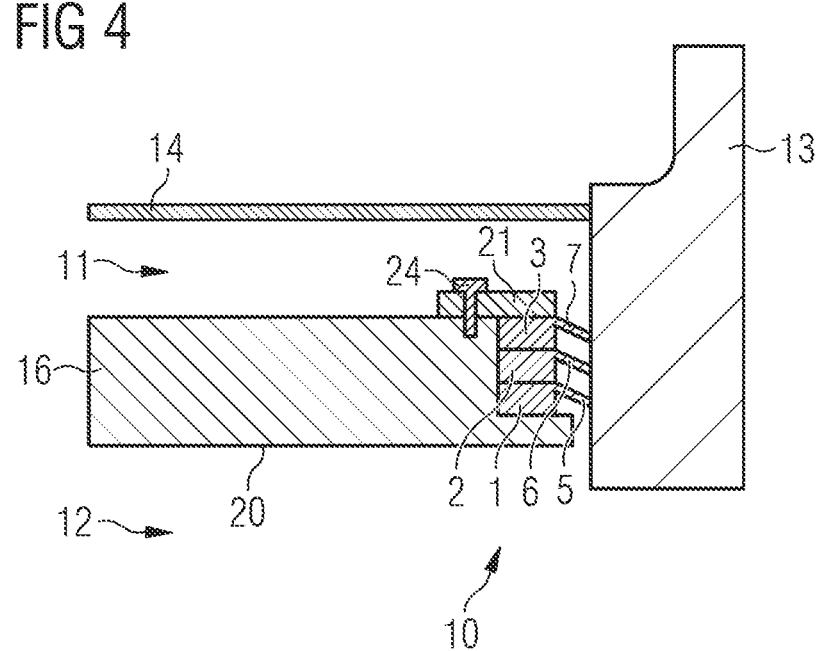
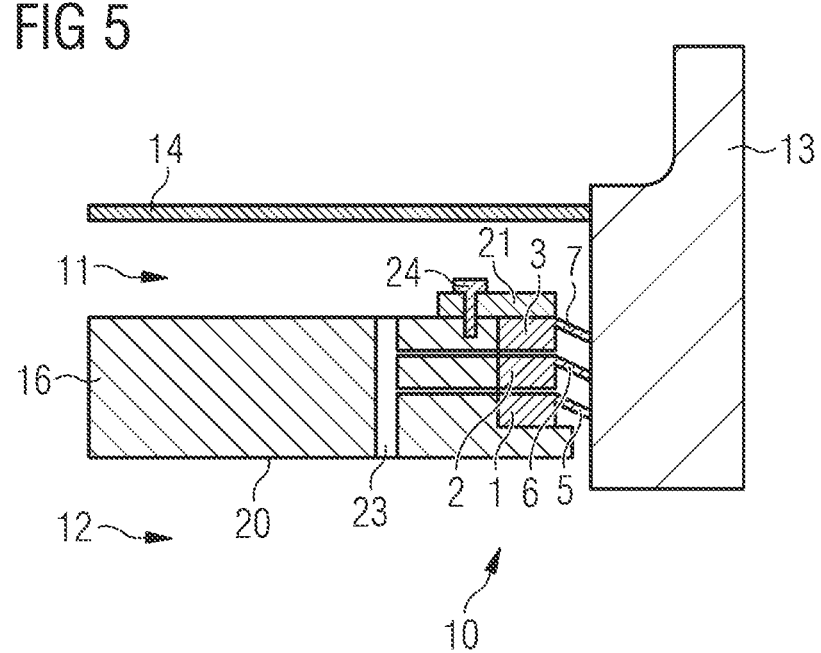

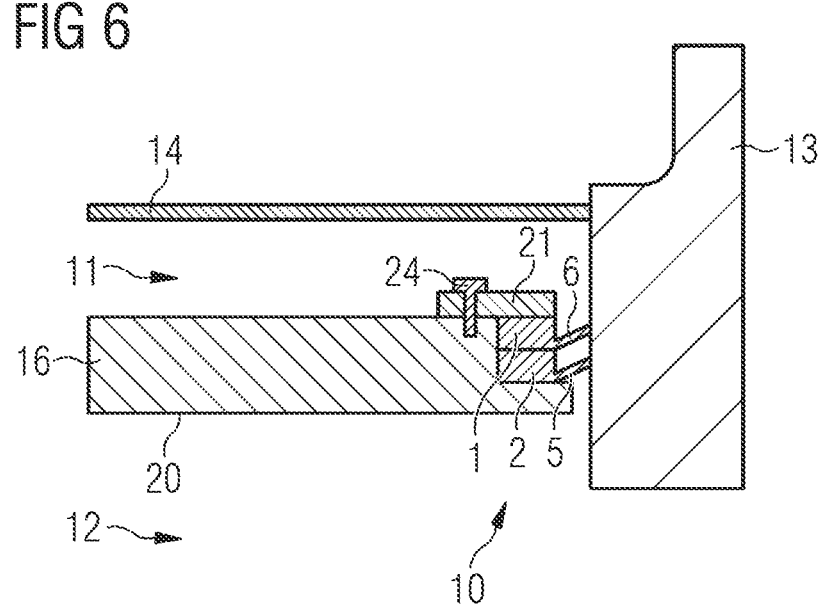
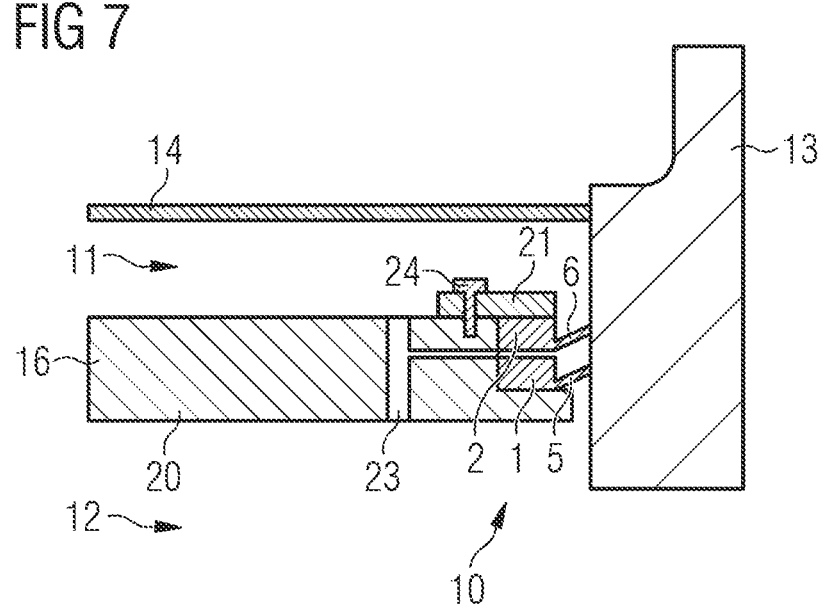

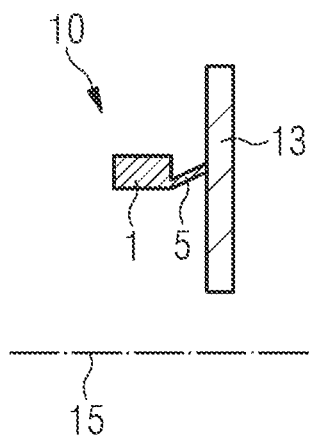
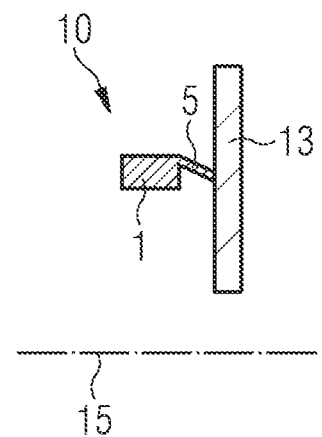
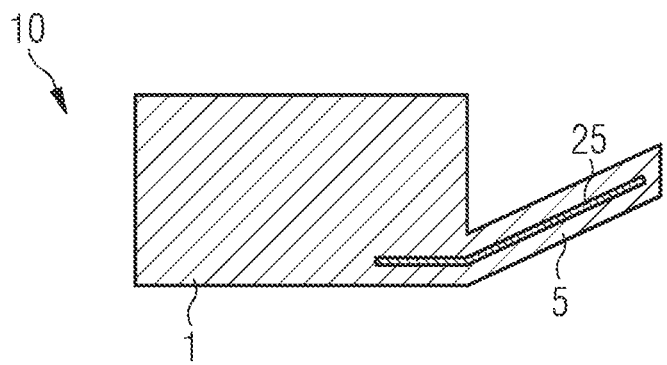

AXIAL SEAL FOR A GENERATOR ROTOR OF A WIND TURBINE

CROSS-REFERENCE TO RELATED APPLICATIONS

This application claims priority to EP Application No. 22210466.3, having a filing date of Nov. 30, 2022, the entire contents of which are hereby incorporated by reference.

FIELD OF TECHNOLOGY

The following relates to a sealing arrangement of a wind turbine for sealing a gap between a stationary member and a generator rotor. The following further relates to a wind turbine comprising the sealing arrangement.

BACKGROUND

Wind turbines are increasingly used for the generation of electrical energy. A wind turbine comprises a tower and a nacelle mounted on the tower, to which a hub is attached. A blade rotor is mounted at the hub and coupled to a generator. A plurality of blades extends from the blade rotor. The blades are oriented in such a way that wind passing over the blades turns the blade rotor, thereby driving the generator. Hence, the rotational energy of the blades is transferred to the generator rotor as part of the generator, which then converts the mechanical energy into electricity and transfers the electricity to the electrical grid.

Due to the rotational parts of the drive train of a wind turbine, proper lubrication is needed. Thus, lubricant chambers are arranged at rotational parts to be able to provide the necessary lubrication. Unintended lubricant leakages should be avoided because they require frequent maintenance and cause a loss of power production during the maintenance procedure. To counteract these leakages and to divide lubricant chambers from air chambers, seals are used between stationary and moving parts of the bearing and of the drive train.

Main bearings in modern wind turbine generators are sealed with standard single-lip rubber seals originally designed for smaller and oil lubricated applications, as shown in DE 10 2010 019 442 A1 or U.S. Pat. No. 4,895,458 A. However, it has shown that the seal design is not appropriate for large size grease lubricated applications, as during operation, the bearing arrangement of a wind turbine is subject to high axial and radial loads, which make the bearing subject to deformation, especially between the stationary and the rotating parts of the bearing. Thus, the standard single-lip rubber seals are not able to keep the bearing tight under load situations.

Standard single-lip rubber seals usually have a sealing lip rotatably sealing against a rotating part such as a rotating ring of the bearing or a rotating shaft supported by the bearing. The sealing lip has to be lubricated in order to allow for the lip to slide on the rotating surface. Furthermore, in order to prevent dust and moisture from entering the bearing area from outside, an additional dust seal may be applied.

In particular for fluid film bearings as main bearings of wind turbines, a high amount of lubrication is needed. Some leakage between the lubricant chambers and the air chambers is unavoidable, as lip seals have to be lubricated in order to slide on the rotating surface and for avoiding too high drag and lip damage. However, a high amount of leakage escaping from the lubricant chambers should be avoided by efficient seals.

For direct drive turbines, where the fluid film bearing is arranged closely to the generator rotor, enough lubrication has to be provided to the seal and at the same time, the leakage of lubricant, in particular oil, outside the lubricant chamber has to be minimized. Usually, a closed bearing system is filled up with lubricant to ensure proper bearing lubrication and that a thin lubricant film layer can be established once the main shaft is rotating. To enable the required lubricant volume for the fluid film bearing operation and for the contact surfaces of the bearing components, a closed system is filled up with lubricant in lubricant chambers, which are closed and sealed chambers. As part of the closed bearing system, lip seals are applied to avoid the lubricant from spilling out of the closed system.

Standard sealing solutions for the generator rotor comprise radial shaft seals on a rotating or stationary shaft to prevent lubricant leakage from the bearing.

The current development of the technology of wind turbines tends to an increased size of wind turbines for harvesting more wind energy, with longer blades and higher towers. As more energy is produced, the size and weight of the drive train components, i.e., the gearbox, the generator or the power electronics, and the components connected to the drive train components have increased in size as well. This increased size of wind turbine components results in higher lubrication requirements and require an efficient sealing of the lubricant chambers to avoid a high leakage to air chambers. Hence, there is a need for the seals of sealing arrangements to adapt to the fast growth of the wind turbine.

SUMMARY

An aspect relates to a sealing arrangement which overcomes the problems known in the conventional art, in particular which provides an improved sealing and minimizes unintended leakages of lubricant.

According to embodiments of the invention, a sealing arrangement of a wind turbine comprises an axial seal, a stationary member and a generator rotor for sealing a gap between the stationary member and the generator rotor.

The generator rotor is a rotating component of the generator which, together with the stator and by the rotational movement transferred from the hub via the main shaft to the generator rotor, generates electricity.

The stationary member can be a part of the main bearing of the drive train of the wind turbine. In particular the stationary member can be a part of the fluid film bearing.

According to embodiments of the invention, the stationary member is arranged between a lubricant chamber and an air chamber. The lubricant chamber is a chamber containing lubricant, in particular oil. The air chamber is a chamber containing air. Some leakage between the lubricant chamber and the air chamber can be given, the leaked oil can be collected in an oil collection system and drained by pipes from the air chamber. This leakage can be needed for example to lubricate the seal of the sealing arrangement.

According to embodiments of the invention, the generator rotor is configured to rotate about a rotational axis. The rotational axis can be the longitudinal axis of the drive train, about which the generator rotor and the main shaft rotate.

According to embodiments of the invention, the seal is arranged at an end of the stationary member. By sealing the gap between the stationary member and the generator rotor, the leakage of oil through the gap between lubricant chamber and the air chamber is minimized.

According to embodiments of the invention, the seal comprises a first lip configured to contact the generator rotor.

The contact of the tip of the lip with the generator rotor is a slipping contact, as the lip is configured to slip on the surface of the generator rotor.

According to embodiments of the invention, the first lip is configured to allow a leakage of lubricant at the contact between the first lip and the generator rotor. The leakage allows to lubricate the first lip and improve the slipping properties, thereby avoiding a too high drag and lip damage, which might result in more frequent maintenance works due to lip replacement.

According to embodiments of the invention, the seal further comprises a second lip arranged radially outwards with respect of the first lip and the rotational axis. The second lip is at least partially lubricated by the leakage of lubricant at the contact between the first lip and the generator rotor. Hence, the first lip of the seal blocks the most part of the lubricant from flowing through the gap but allows for a minor leakage to lubricate the second lip. The lubricant, in particular oil, that passes through the first lip is then held back by the second lip, which works as a back-up and further minimizes the leakage to the air chamber.

For a lip seal to work optimally, it needs to be lubricated at the lip, if the lip seal is not exposed to lubricant it will wear down and needs to be exchanged frequently. By allowing a controlled leakage of the first lip, a proper lubrication of the second lip is ensured. Further leakage from the second lip to the air chamber can be collected by a leakage collection system and then filtered and pumped back into the lubricant chamber.

According to an embodiment of the invention, the first lip and/or the second lip extend at least partially in an axial direction with respect to the rotational axis between the stationary member and the generator rotor. As the seal is an axial seal, the axial direction should be blocked by at least one lip.

According to an embodiment of the invention, the first lip and/or the second lip extend at least partially in a radial direction with respect to the rotational axis between the stationary member and the generator rotor. By extending at least partially in the radial direction, a considerable amount of lubricant, like grease or oil, which comes in contact with the seal is moved away from the sealing area back to the inside of the lubricant chamber, so it cannot escape the lubricant chamber. The lip can point towards the interior space of the lubricant chamber for conveying the lubricant into the interior space of the lubricant chamber. Hence, in this embodiment, the seal makes use of the relative rotational movement between the lubricant and the generator rotor.

According to an embodiment of the invention, the lubricant chamber is arranged at the radially inner part of the seal with respect to the rotational axis.

According to an embodiment of the invention, the air chamber is arranged at the radially outer part of the seal with respect to the rotational axis.

According to an embodiment of the invention, the seal further comprises a third lip and/or further lips, wherein each of the lips is configured to allow a leakage of lubricant at the contact between the respective lip and the generator rotor. Each further lip provided further minimizes the leakage of lubricant to the air chamber.

According to an embodiment of the invention, each lip is arranged at a separate sealing element. Hence, the seal comprises at least two sealing elements which itself comprise a sealing lip each. Having this configuration makes the replacement of single sealing elements easier.

According to an embodiment of the invention, at least two lips are integrally formed with at least one sealing element. An integral connection between the lips and the sealing element can be achieved with permanent joining methods which permanently join the surfaces of individual components together to create a single component which cannot be separated into the original individual components without considerable damage. An integral connection can also be achieved during the production of the seal. In this case, the mold used to produce the seal comprises both the shape of the sealing element as well as the shape of both lips.

According to an embodiment of the invention, the seal comprises an elastomeric material such as rubber. Rubber or plastic allow for flexible seals, while at the same time providing a fluid-tight barrier. The flexibility of this type of seal allows to compensate for tolerance errors as well.

According to an embodiment of the invention, the seal comprises an integrated spring member, wherein the spring member extends at least partially through the first lip. To ensure sufficient contact pressure between the sealing lip and the generator rotor, a spring member, in particular a garter spring, is provided at the sealing lip. The garter spring can be located on the side of the first sealing lip facing the lubrication chamber within a circumferential groove of the first lip.

The spring can be made of steel and ensures constant contact lip force and compensates for the bearing deflections in the axial direction.

According to an embodiment of the invention, the seal comprises an integrated spring member for each lip, wherein the spring member extends at least partially through the respective lip.

According to an embodiment of the invention, the stationary member further comprises a channel for allowing lubricant to flow between the lubricant chamber and the air chamber.

The channel can be an already provided channel between the lubricant chamber and the air chamber, such as a pressure relief channel, which is used to relief an overpressure at the lubricant chamber. Such channels usually comprise a screw in orifice to limit the leakage of oil through the channel while allowing the compensation of overpressure.

Alternatively, a channel can be drilled in the stationary member so that lubricant can pass from the lubricant chamber to the air chamber, thereby lubricating the part of the seal facing the air chamber.

According to an embodiment of the invention, the channel extends at least partially towards the seal for lubricating the lips of the seal. The channel of the stationary member can extend up to the seal and the seal can comprise channels within the seal so that lubricant can reach the sealing lips and ensure a proper lubrication of the lips.

According to an embodiment of the invention, the stationary member further comprises a seal clamping plate for holding the seal in position. The seal clamping plate can be fastened to the stationary member by fastening means such as a bolt, screw, pin, rivet, thread or stud.

According to an embodiment of the invention, the lubricant is oil. Oil as a lubricant is commonly used in fluid film bearings.

According to an embodiment of the invention, the tip of at least one sealing lip comprises Teflon to decrease the wear and improve the sliding of the lip on the generator rotor surface.

According to an embodiment of the invention, the generator rotor is fixedly coupled to the bearing outer ring.

According to an embodiment of the invention, the bearing outer ring is a hardened bearing outer ring.

Yet another aspect of embodiments of the invention relate to a wind turbine comprising a sealing arrangement as described above.

BRIEF DESCRIPTION

Some of the embodiments will be described in detail, with reference to the following figures, wherein like designations denote like members, wherein:

FIG. 2 shows a sealing arrangement according to another embodiment of the invention;

FIG. 3 shows a sealing arrangement according to another embodiment of the invention.

FIG. 4 shows a sealing arrangement according to another embodiment of the invention;

FIG. 5 shows a sealing arrangement according to another embodiment of the invention;

FIG. 6 shows a sealing arrangement according to another embodiment of the invention;

FIG. 7 shows a sealing arrangement according to another embodiment of the invention;

FIG. 8 shows two different orientations of sealing lips with respect to the rotational axis;

FIG. 9 shows two different orientations of sealing lips with respect to the rotational axis; and FIG. 10 shows a sealing lip comprising a spring member.

DETAILED DESCRIPTION

Figure 1:
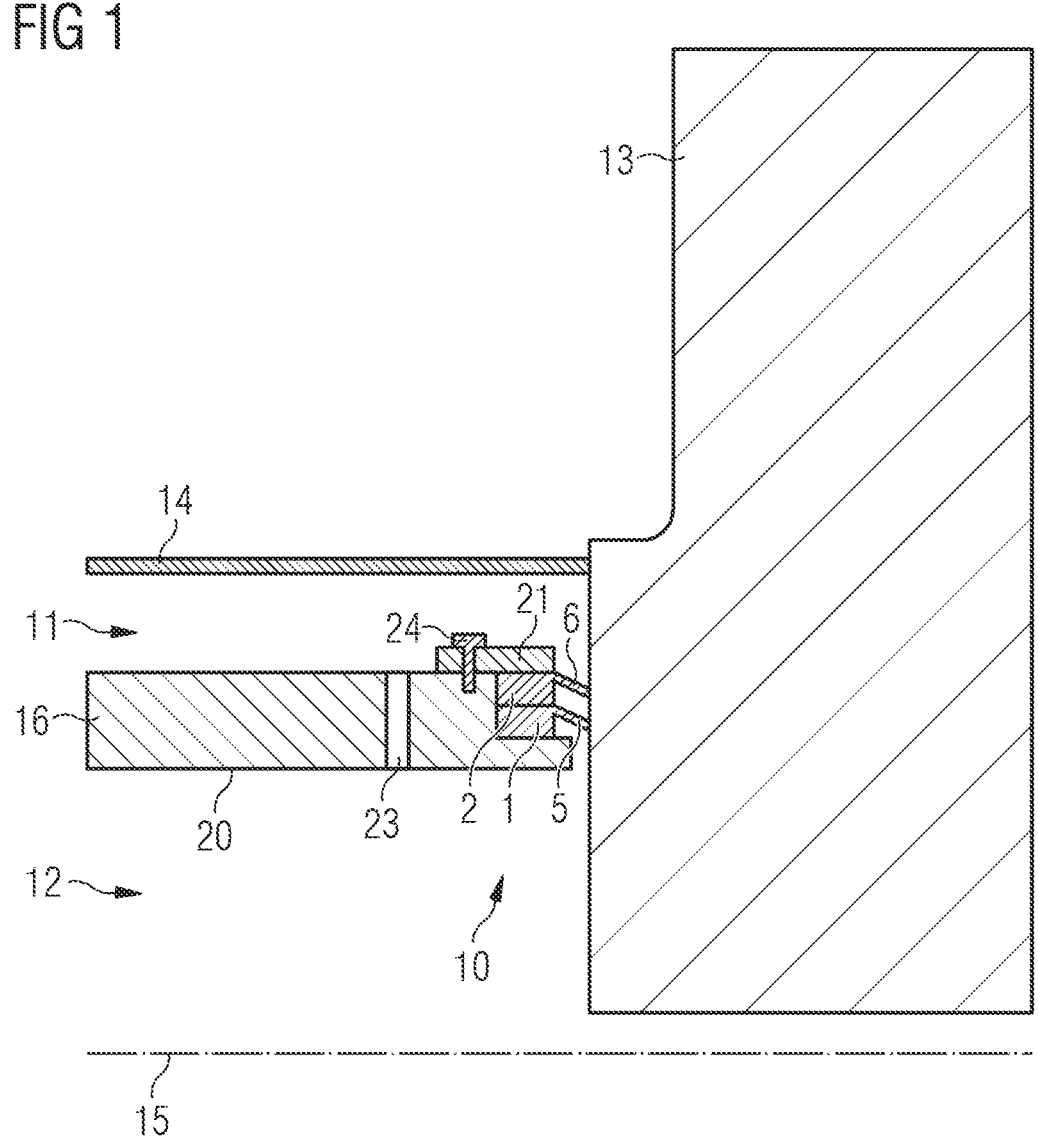
FIG. 1 shows a sealing arrangement according to one embodiment of the invention.

FIG. 1 shows a sealing arrangement of a wind turbine comprising an axial seal 10, a stationary member 16 and a generator rotor 13 for sealing a gap between the stationary member 16 and the generator rotor 13. The stationary member 16 is arranged between a lubricant chamber 12 and an air chamber 11. The generator rotor 13 is configured to rotate about a rotational axis 15. The seal 10 is arranged at an end of the stationary member 16. The seal 10 comprises a first lip 5 configured to contact the generator rotor 13. The first lip 5 is configured to allow a leakage of lubricant at the contact between the first lip 5 and the generator rotor 13. The seal 10 further comprises a second lip 6 arranged radially outwards with respect of the first lip 5 and the rotational axis 15. The second lip 6 is at least partially lubricated by the leakage of lubricant at the contact between the first lip 5 and the generator rotor 13. The first lip 5 and the second lip 6 extend partially in an axial direction and partially in a radial direction towards the rotational axis 15 between the stationary member 16 and the generator rotor 13. The lubricant chamber 12 is arranged at the radially inner part of the seal 10 with respect to the rotational axis 15. The first lip 5 is arranged at the first sealing element 1. The second lip 6 is arranged at the second sealing element 2. The stationary member 16 further comprises a channel 23 for allowing lubricant to flow between the lubricant chamber 11 and the air chamber 12, the channel 23 extends radially between the lubricant chamber 11 and the air chamber 12. The stationary member 16 further comprises a seal clamping plate 21 for holding the seal 10 in position. The seal clamping plate 21 is fastened to the stationary member 16 by fastening means 24 such as a bolt.

FIG. 2 shows the sealing arrangement according to another embodiment of the invention. In this figure, no channel 23 is present, so the lubrication of the second lip 6 is achieved by leakage of lubricant at the contact between the first lip 5 and the generator rotor 13.

FIG. 3 shows the sealing arrangement according to another embodiment of the invention. In this embodiment, the first lip 5 and the second lip 6 are integrally formed with the first sealing element 1.

FIG. 4 shows the sealing arrangement according to another embodiment of the invention. In this embodiment, the seal 10 further comprises a third lip 7, wherein each of the lips 5, 6, 7 is configured to allow a leakage of lubricant at the contact between the respective lip 5, 6, 7 and the generator rotor 13.

FIG. 5 shows the sealing arrangement according to another embodiment of the invention. In this embodiment, the seal 10 further comprises a third lip 7, wherein each lip 5, 6, 7 is arranged at a separate sealing element 1, 2, 3. A channel 23 is provided at the stationary member 16 extending towards each separation of the separate sealing elements 1, 2, 3 to lubricate the region between each separate sealing element 1, 2, 3, thereby providing sufficient lubrication to each lip 5, 6, 7.

FIG. 6 shows the sealing arrangement according to another embodiment of the invention. In this embodiment, the first lip 5 and the second lip 6 extend partially in an axial direction and partially in a radial direction away from the rotational axis 15 between the stationary member 16 and the generator rotor 13.

FIG. 7 shows the sealing arrangement according to another embodiment of the invention. In this embodiment, a channel 23 is provided between each separate sealing element 1, 2 to lubricate the region between the separate sealing elements 1, 2.

FIGS. 8 and 9 show two different orientations of sealing lips 5 with respect to the rotational axis 15.

FIG. 10 shows the sealing arrangement according to another embodiment of the invention. The seal 10 comprises an integrated spring member 25, wherein the spring member 25 extends through the first lip 5. The spring member 25 can be made of steel and ensures constant contact lip force and compensates for the bearing deflections in the axial direction.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE NUMBERS

1 First sealing element
2 Second sealing element
3 Third sealing element
5 First lip
6 Second lip
7 Third lip
10 Seal
11 Air chamber
12 Lubricant chamber
13 Generator rotor
14 Housing
15 Rotational axis
16 Stationary member
21 Seal clamping plate 23 Channel
24 Fastening means
25 Spring member

The invention claimed is:

1. A sealing arrangement of a wind turbine comprising an axial seal, a stationary member and a generator rotor for sealing a gap between the stationary member and the generator rotor;
- wherein the stationary member is arranged between a lubricant chamber and an air chamber;
- wherein the generator rotor is configured to rotate about a rotational axis;
- wherein the seal is arranged at an end of the stationary member,
- wherein the seal comprises a first lip configured to contact the generator rotor;
- wherein the first lip is configured to allow a leakage of lubricant at the contact between the first lip and the generator rotor;
- wherein the seal further comprises a second lip arranged radially outwards with respect of the first lip and the rotational axis; and
- wherein the second lip is at least partially lubricated by the leakage of lubricant at the contact between the first lip and the generator rotor.

2. The sealing arrangement according to claim 1, wherein the first lip and/or the second lip extend at least partially in an axial direction with respect to the rotational axis between the stationary member and the generator rotor.

3. The sealing arrangement according to claim 1, wherein the first lip and/or the second lip extend at least partially in a radial direction with respect to the rotational axis between the stationary member and the generator rotor.

4. The sealing arrangement according to claim 1, wherein the lubricant chamber is arranged at the radially inner part of the seal with respect to the rotational axis.

5. The sealing arrangement according to claim 1, wherein the air chamber is arranged at the radially outer part of the seal with respect to the rotational axis.

6. The sealing arrangement according to claim 1, wherein the seal further comprises a third lip and/or further lips, wherein each of the lips is configured to allow a leakage of lubricant at the contact between the respective lip and the generator rotor.

7. The sealing arrangement according to claim 1, wherein each lip is arranged at a separate sealing element.

8. The sealing arrangement according to claim 1, wherein at least two lips are integrally formed with at least one sealing element.

9. The sealing arrangement according to claim 1, wherein the seal comprises an elastomeric material such as rubber.

10. The sealing arrangement according to claim 1, wherein the seal comprises an integrated spring member, wherein the spring member extends at least partially through the first lip.

11. The sealing arrangement according to claim 1, wherein the seal comprises an integrated spring member for each lip, wherein the spring member extends at least partially through the respective lip.

12. The sealing arrangement according to claim 1, wherein the stationary member further comprises a channel for allowing lubricant to flow between the lubricant chamber and the air chamber.

13. The sealing arrangement according to claim 12, wherein the channel extends at least partially towards the seal for lubricating the lips of the seal.

14. The sealing arrangement according to claim 1, wherein the lubricant is oil.

15. A wind turbine comprising a sealing arrangement according to claim 1.

* * * * *